United States Patent
Pfeiffer et al.

(10) Patent No.: US 8,927,669 B2
(45) Date of Patent: Jan. 6, 2015

(54) COPOLYMERS, METHOD FOR PRODUCING THEM AND THEIR USE FOR TREATING SURFACES

(75) Inventors: Thomas Pfeiffer, Böhl-Iggelheim (DE); Helmut Witteler, Wachenheim (DE); Frank Dietsche, Schriesheim (DE); Thomas Heidenfelder, Dannstadt-Schauernheim (DE); Frank-Olaf Mähling, Mannheim (DE); Andreas Fechtenkötter, Singapore (SG); Michael Ehle, Ludwigshafen (DE); Fabio Nicolini, Mutterstadt (DE)

(73) Assignee: BASF SE (DE)

( * ) Notice: Subject to any disclaimer, the term of this patent is extended or adjusted under 35 U.S.C. 154(b) by 1285 days.

(21) Appl. No.: 12/160,371

(22) PCT Filed: Jan. 5, 2007

(86) PCT No.: PCT/EP2007/050111
§ 371 (c)(1),
(2), (4) Date: Jul. 9, 2008

(87) PCT Pub. No.: WO2007/080152
PCT Pub. Date: Jul. 19, 2007

(65) Prior Publication Data
US 2010/0273015 A1 Oct. 28, 2010

(30) Foreign Application Priority Data
Jan. 9, 2006 (EP) .................. 06100170

(51) Int. Cl.
*C08F 230/02* (2006.01)
*C09D 5/08* (2006.01)
*C08F 210/02* (2006.01)
*C23C 22/78* (2006.01)
*C23C 22/06* (2006.01)
*C23C 22/05* (2006.01)
*C23C 22/07* (2006.01)
*C23C 22/63* (2006.01)
*C23C 22/62* (2006.01)
*C23C 22/60* (2006.01)
*C08F 220/06* (2006.01)

(52) U.S. Cl.
CPC . *C09D 5/08* (2013.01); *C23C 22/78* (2013.01); *C23C 22/06* (2013.01); *C23C 22/05* (2013.01); *C23C 22/07* (2013.01); *C23C 22/63* (2013.01); *C23C 22/62* (2013.01); *C23C 22/60* (2013.01); *C08F 210/02* (2013.01); *C08F 220/06* (2013.01); *C08F 230/02* (2013.01)
USPC ........................................ 526/274

(58) Field of Classification Search
CPC ........ C23C 22/05; C23C 22/06; C23C 22/07; C23C 22/60; C23C 22/62; C23C 22/63; C23C 22/66; C23C 22/78; C08F 230/02; C08F 210/02
USPC ........................................ 526/274
See application file for complete search history.

(56) References Cited

U.S. PATENT DOCUMENTS

| 3,169,940 | A |   | 2/1965 | Zutty |
| 3,904,685 | A | * | 9/1975 | Shahidi et al. ............. 562/594 |
| 4,749,758 | A | * | 6/1988 | Dursch et al. ............. 526/216 |
| 4,931,497 | A | * | 6/1990 | Engelhardt et al. ......... 525/42 |
| 2005/0163933 | A1 |   | 7/2005 | Dietsche et al. |

FOREIGN PATENT DOCUMENTS

| EP | 0846733 | 6/1998 |
| WO | WO-2004074372 | 9/2004 |

OTHER PUBLICATIONS

Zouahri, A. et al.."Synthesis of ion exchange membranes from ozonized high density polyethylene", European Polymer Journal 2002, 38(11), 2247-2254.*

* cited by examiner

*Primary Examiner* — Richard A Huhn
(74) *Attorney, Agent, or Firm* — Drinker Biddle & Reath LLP

(57) ABSTRACT

Copolymers comprising as comonomers in copolymerized form:
(a) ethylene,
(b) one or more compounds of the general formula I

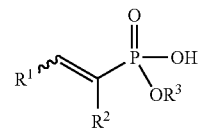

(c) if appropriate, one or more alkenylphosphonic diesters,
(d) if appropriate, one or more other free-radically copolymerizable comonomers,
whose variables are defined as follows:
$R^1$ is selected from hydrogen and unbranched and branched $C_1$-$C_{10}$-alkyl,
$R^2$ is selected from hydrogen and unbranched and branched $C_1$-$C_{10}$-alkyl,
$R^3$ is selected from hydrogen, phenyl, benzyl, and unbranched and branched $C_1$-$C_{10}$-alkyl and unbranched and branched hydroxy-$C_2$-$C_{10}$-alkyl,
as free acid or partially or completely neutralized with alkali metal, alkaline earth metal, ammonia or organic amine.

19 Claims, No Drawings

COPOLYMERS, METHOD FOR PRODUCING THEM AND THEIR USE FOR TREATING SURFACES

This application is a national phase of PCT/EP2007/050111, filed on Jan. 5, 2007, which claims priority to EP 06100170.7, filed Jan. 9, 2006, the entire contents of all are hereby incorporated by reference.

The present invention relates to copolymers comprising as comonomers in copolymerized form:
(a) ethylene,
(b) one or more compounds of the general formula I

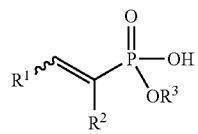

(c) if appropriate, one or more alkenylphosphonic diesters,
(d) if appropriate, one or more other free-radically copolymerizable comonomers,
whose variables are defined as follows:
$R^1$ is selected from hydrogen and unbranched and branched $C_1$-$C_{10}$-alkyl,
$R^2$ is selected from hydrogen and unbranched and branched $C_1$-$C_{10}$-alkyl,
$R^3$ is selected from hydrogen, phenyl, benzyl, and unbranched and branched $C_1$-$C_{10}$-alkyl and unbranched and branched hydroxy-$C_2$-$C_{10}$-alkyl,
as free acid or partially or completely neutralized with alkali metal, alkaline earth metal, ammonia or organic amine.

The present invention also relates to a process for preparing copolymers of the invention. The present invention additionally relates to the use of the copolymers of the invention for the purpose, for example, of treating surfaces. The present invention additionally relates to surfaces coated with the copolymer of the invention.

The surface treatment of, for example, metal surfaces or polymer surfaces is a field of great economic importance. The surface treatment may for example be a treatment for the purpose of coating-material adhesion, for the purpose of protecting a coating material under corrosive exposure from sub-film rust spread, for the purpose of improving the coefficient of friction with other surfaces, particularly in the case of cold forming, such as by deep drawing, folding, crimping or bending, for the purpose of achieving a decorative appearance, gloss and roughness for example or for the purpose of enhancing the bondability, the whirlability, and, in particular, the corrosion protection.

Imparting corrosion resistance to surfaces by treating them with compounds such as, for example, 1,12-docecanedi (phosphonic acid dimethyl ester) is known. Such treatment has the disadvantage, however, of acting exclusively as protection against sub-film corrosion for combinations of particular metals with particular coating materials, and when employed alone does not build up a corrosion protection layer.

The object was therefore to provide a method of treating surfaces of metal or polymer, for example, and thereby to achieve an overall improvement in properties and in particular improved corrosion protection. A further object was to provide coated surfaces. A still-further object was to find suitable materials with particular suitability for treating surfaces. In particular the object was to provide compounds which are able to act not only in aqueous solution as a corrosion inhibitor but also after drying out onto a metal surface as a corrosion protection layer.

The invention accordingly provides the above-defined copolymers and the method defined at the outset Copolymers of the invention comprise in copolymerized form:
(a) ethylene,
(b) at least one compound of the general formula I

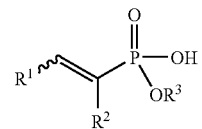

whose variables are defined as follows:
$R^1$ is selected from branched and preferably unbranched $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$-alkyl such as methyl, ethyl, n-propyl or n-butyl, especially methyl, and with very particular preference hydrogen,
$R^2$ is selected from branched and preferably unbranched $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$-alkyl such as methyl, ethyl, n-propyl or n-butyl, especially methyl, and with very particular preference hydrogen,
$R^3$ is different or, preferably, identical and is selected from hydrogen;
phenyl, unsubstituted or substituted one to three times by for example halogen,
chlorine for example, or, for example, by unbranched $C_1$-$C_4$-alkyl such as methyl, ethyl, n-propyl or n-butyl, especially methyl,
benzyl,
and branched and preferably unbranched $C_1$-$C_4$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; more preferably unbranched $C_1$-$C_4$-alkyl such as methyl, ethyl, n-propyl or n-butyl, especially methyl,
and branched and preferably unbranched hydroxy-$C_2$-$C_{10}$-alkyl, preferably 2-hydroxy-$C_2$-$C_6$-alkyl or ω-hydroxy-$C_2$-$C_6$-alkyl. Examples of 2-hydroxy-$C_2$-$C_6$-alkyl are 2-hydroxy-ethyl, 2-hydroxy-n-propyl, 2-hydroxy-n-butyl, 2-hydroxy-n-hexyl, 2-hydroxy-n-hexyl, and 2-hydroxyisopropyl. Examples of ω-hydroxy-$C_2$-$C_6$-alkyl are 3-hydroxypropyl, 4-hydroxybutyl, 5-hydroxypentyl, 6-hydroxyhexyl, and, in particular, 2-hydroxyethyl.

(c) if appropriate, one or more alkenylphosphonic diesters, alkenylphosphonic diester (c) preferably being a compound of the formula II

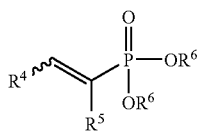

whose variables are defined as follows:

$R^4$ is selected from branched and preferably unbranched $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$-alkyl such as methyl, ethyl, n-propyl or n-butyl, especially methyl, and with very particular preference hydrogen, $R^6$ is selected from branched and preferably unbranched $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$-alkyl such as methyl, ethyl, n-propyl or n-butyl, especially methyl, and with very particular preference hydrogen, $R^6$ is different or, preferably, identical and is selected from phenyl, unsubstituted or substituted one to three times by for example halogen, chlorine for example, or, for example, by unbranched $C_1$-$C_4$-alkyl such as methyl, ethyl, n-propyl or n-butyl, especially methyl, benzyl, and branched and preferably unbranched $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl; more preferably unbranched $C_1$-$C_4$-alkyl such as methyl, ethyl, n-propyl or n-butyl, especially methyl.

The radicals $R^6$ can be joined to one another to form a five- to 10-membered ring. Thus the group $P(O)(OR^5)_2$ may for example be:

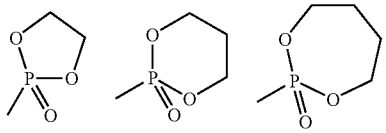

(d) if appropriate, one or more other free-radically copolymerizable comonomers.

In one embodiment of the present invention one or more other free-radically copolymerizable comonomers (d) are selected from ethylenically unsaturated carboxylic acids, such as crotonic acid and especially (meth)acrylic acid, (meth)acrylic acid $C_1$-$C_{10}$-alkyl esters, especially methyl (meth)acrylate, ethyl (meth)acrylate, n-butyl (meth)acrylate, and 2-ethylhexyl (meth)acrylate, vinyl formate, $C_1$-$C_{10}$-alkylcarboxylic acid vinyl esters, such as vinyl acetate or vinyl propionate, ethylenically unsaturated $C_4$-$C_{10}$-dicarboxylic acids and their anhydrides, $C_1$-$C_{20}$-alkyl vinyl ethers and $C_1$-$C_{20}$-alkyl allyl ethers, and α-olefins having 3 to 40 carbon atoms, such as isobutene, 1-butene, diisobutene, 1-hexene, and 1-dodecene, for example.

Preferred comonomers (d) are selected from ethylenically unsaturated carboxylic acids, such as crotonic acid and especially (meth)acrylic acid, and from ethylenically unsaturated $C_4$-$C_{10}$-dicarboxylic acids and their anhydrides, especially itaconic anhydride and very particularly maleic anhydride.

In one embodiment of the present invention copolymers of the invention comprise no other comonomer (d) in copolymerized form.

In the context of the present invention "comprise in copolymerized form" in connection with compounds of the general formula I does not necessarily mean that a compound of the general formula I as such is reacted with ethylene and, if appropriate, one or more alkenylphosphonic diesters (c) and/or one or more comonomers (d). Instead, copolymers of the invention formally comprise at least one compound of the general formula I in copolymerized form; that is, they comprise units which derive formally from one or more compounds of the general formula I as comonomer.

In one embodiment of the present invention the two radicals $R^6$ are different, one radical $R^6$ being methyl and the other ethyl or n-propyl or isopropyl, for example.

In another, preferred embodiment of the present invention the two radicals $R^6$ are identical and in particular are selected from methyl and ethyl.

In one embodiment of the present invention $R^1$ and $R^2$ are each hydrogen and $R^3$ is selected from $C_1$-$C_4$-alkyl, in particular selected from methyl and ethyl.

In one embodiment of the present invention Wand $R^5$ are each hydrogen and the radicals $R^6$ are each identical and selected from $C_1$-$C_4$-alkyl, in particular selected from methyl and ethyl.

In one embodiment of the present invention $R^3$ and $R^6$ are in each case identical.

In one embodiment of the present invention $R^1$ and $R^4$, $R^2$ and $R^5$, and $R^3$ and $R^6$, in each case in pairs, are identical; in other words, $R^1$ and $R^4$ are each identical, $R^2$ and $R^5$ are each identical, and $R^3$ and $R^6$ are each identical.

Preferably $R^1$, $R^2$, $R^4$, and $R^5$ are each identical and with particular preference are each hydrogen.

In one embodiment of the present invention copolymers of the invention comprise two different compounds of the formula I in copolymerized form, of which $R^1$ and $R^4$ and also $R^2$ and $R^5$, in each case in pairs, are identical, and of which one $R^3$ is hydrogen and the other $R^3$ is selected from phenyl, benzyl, $C_1$-$C_{10}$-alkyl, and $C_2$-$C_{10}$-hydroxyalkyl, especially linear $C_1$-$C_4$-alkyl, and, with very particular preference, methyl.

In one embodiment of the present invention copolymer of the invention comprises copolymer having an average molecular weight $M_w$ in the range from 1000 to 500 000 g/mol, preferably 1000 to 200 000 g/mol, and very preferably 1500 to 150 000 g/mol.

In one embodiment of the present invention copolymer of the invention has a melt flow rate (MFR) in the range from 1 to 50 g/10 min, preferably 5 to 20 g/10 min, more preferably 7 to 15 g/10 min, measured at 160° C. under a load of 325 g in accordance with EN ISO 1133.

In one embodiment of the present invention copolymer of the invention has a kinematic melt viscosity v at 120° C. of 60 mm²/s to 100 000 mm²is, preferably 100 mm²/s to 50 000 mm²/s.

In one embodiment of the present invention the melting range of copolymer of the invention is situated in the range from 50 to 120° C., preferably in the range from 60 to 110° C., determined by DSC in accordance with DIN 51007.

In one embodiment of the present invention the melting range of copolymer of the invention may be broad and may relate to a temperature range of at least 7 to not more than 20° C., preferably at least 10° C. and not more than 15° C.

In another embodiment of the present invention the melting point of copolymer of the invention is sharply defined and lies within a temperature range of less than 2° C., preferably less than 1° C., determined in accordance with DIN 51007.

The density of copolymer of the invention is typically 0.89 to 1.10 g/cm$^3$, preferably 0.92 to 0.99 g/cm$^3$, determined in accordance with DIN 53479.

In one embodiment of the present invention the acid number of copolymer of the invention is situated in the range from 10 to 250 mg KOH/g of copolymer, preferably 20 to 200 mg KOH/g of copolymer, determined in accordance with DIN 53402.

Copolymers of the invention may be alternating copolymers or block copolymers or, preferably, random copolymers.

In one specific embodiment of the present invention copolymer of the invention comprises substantially random copolymers which may have one or more alternating comonomer sequences or one or more comonomer sequences with block character, in copolymerized form.

Copolymers of the invention may be present as free acid or partially or completely neutralized, with, for example, divalent or polyvalent cations, such as alkaline earth metal cations, $Zn^{2+}$, $Zr^{4+}$, $ZrO^{2+}$, $Cr^{3+}$, $Mn^{2+}$, $Fe^{2+}$, $Fe^{3+}$, $Co^{2+}$, $Ni^{2+}$, $Cu^{2+}$, $Al^{3+}$, $Ce^{3+}$, $V^{2+}$, $V^{3+}$, preferably $Mg^{2+}$, $Ca^{2+}$, $Zn^{2+}$ or $Mn^{2+}$ and $Cr^{3+}$, preferably with monovalent cations such as alkali metal, such as $Na^+$ or $K^+$, or with ammonia or organic amine, especially $C_1$-$C_4$-monoalkylamine, di-$C_1$-$C_4$-alkylamine, tri-$C_1$-$C_4$-alkylamine or tetra-$C_1$-$C_4$-alkyl-ammonium.

In one embodiment of the present invention, all or up to 90 mol %, preferably up to 75 mol %, of the carboxylic acid groups and/or P(O)—OH groups of copolymers of the invention are neutralized with hydroxyalkylammonium, in particular of the formula $(C_1$-$C_4$-alkyl$)_x(C_2$-$C_4$-$\omega$-hydroxyalkyl$)_yNH_{4-x-y}$, where x is an integer in the range from zero to three, preferably zero or one, y is an integer in the range from one to four, with the proviso that the sum of x and y does not exceed a value of four.

Preferred examples of $C_1$-$C_4$-$\omega$-hydroxyalkyl are 3-hydroxypropyl, 4-hydroxybutyl, and, in particular, 2-hydroxyethyl, referred to below also as hydroxyethyl.

Particularly preferred examples of hydroxyalkylammonium are N,N-dihydroxyethylammonium, N-methyl-N-hydroxyethylammonium, N,N-dimethyl-N-hydroxyethylammonium, N-methyl-N,N-dihydroxyethylammonium, N-n-butyl-hydroxyethylammonium, and N-n-butyl-N,N-dihydroxyethylammonium.

Particularly suitable amines for neutralizing are trialkylamines and alkanolamines having less than 30, more preferably less than 10 carbon atoms, Especially preferred amines for neutralizing are
(3-aminopropyl)amino-2-ethanol, 1,1-dimethylpropyn-2-ylamine, 1,2-ethanediamine, 1,2-propylenediamine, 1,3-propanediamine, 1,6-hexanediamine, 1-amino-2-propanol, 2-(dimethylamino)ethanol, 2-phenylaminoethanol, 6-amino-1-hexanol, cyclohexylamine, diethanolamine, diisopropanolamine, dimethylamine, dimethylaminoethoxyethanol, ethanolamine, ethylamine, coconut fatty amine, triethanolamine, cyclohexylamine and N,N-dimethylaminocyclohexane.

Further suitable organic amines for neutralization are, for example, morpholine, imidazole, imidazolines, oxazolines, triazoles and fatty amines.

Suitable neutralizing agents are, in addition, KOH, NaOH, $Ca(OH)_2$, $NaHCO_3$, $Na_2CO_3$, $K_2CO_3$, and $KHCO_3$.

In one embodiment of the present invention neutralization can be carried out using stoichiometric amounts or an excess of transition metal complexes, such as of one or more transition metal amines or transition metal ammonium complexes, preferably one or more zinc-amine and/or zinc-ammonia complexes, examples being salts of $Zn(NH_3)_4(H_2O)_2]^{2+}$ such as sulfates or nitrates, for example. In particular the use of zinc-ammonia complexes has the advantage that, after drying, a film which is crosslinked via zinc ions is formed, which does not readily dissolve even in aggressive media and which therefore offers enhanced corrosion protection.

The present invention further provides a process for preparing copolymers of the invention.

Copolymers of the invention can be prepared, for example, by subjecting ethylene (a), one or more compounds of the general formula I (b), and, if appropriate, one or more alkenylphosphonic diesters (c), and, if appropriate, one or more other free-radically copolymerizable comonomers (d) to copolymerization with one another.

Copolymers of the invention can be prepared, especially when $R^1$ and $R^4$, $R^2$ and $R^5$, and $R^3$ and $R^6$, in each case in pairs, are identical, by means of preferably free-radically initiated copolymerization of ethylene (a), at least one alkenylphosphonic diester (c), and, if appropriate, one or more other free-radically copolymerizable comonomers (d) under high-pressure conditions, such as in stirred high-pressure autoclaves or in high-pressure tube reactors, for example, followed by at least partial hydrolysis of copolymerized alkenylphosphonic diester (c).

The present invention further provides a process for preparing copolymers of the invention which comprises subjecting (a) ethylene, (c) if appropriate, one or more alkenylphosphonic diesters, (d) if appropriate, one or more other free-radically copolymerizable comonomers to copolymerization with one another at 500 to 4000 bar and reaction temperatures in the range from 150 to 300° C., preferably with free-radical initiation, and subsequently to at least partial hydrolysis.

The free-radically initiated copolymerization, also referred to for short as copolymerization below, is conducted preferably in stirred high-pressure autoclaves. Stirred high-pressure autoclaves are known per se: a description is found in *Ullmann's Encyclopedia of Industrial Chemistry*, 5th edition, keyword: Waxes, vol. A 28, p. 146 ff., Verlag Chemie Weinheim, Basle, Cambridge, New York, Tokyo, 1996. The length/diameter ratio of such autoclaves is predominantly in ranges from 5:1 to 30:1, preferably 10:1 to 20:1. The high-pressure tube reactors which it is equally possible to employ are likewise found in *Ullmann's Encyclopedia of Industrial Chemistry* 5th edition, keyword: Waxes, vol. A 28, p. 146 ff., Verlag Chemie Weinheim, Basle, Cambridge, New York, Tokyo, 1996.

Suitable pressure conditions for the copolymerization are 500 to 4000 bar, preferably 1500 to 2500 bar. Conditions of this kind are also referred to below as high pressure. The reaction temperatures are in the range from 150 to 300° C., preferably in the range from 195 to 280° C.

The copolymerization can be carried out in the presence of a regulator. Regulators used include, for example, hydrogen or at least one aliphatic aldehyde or at least one aliphatic ketone of the general formula III

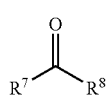

or mixtures thereof.

The radicals $R^7$ and $R^8$ are-identical or different and are selected from hydrogen;

$C_1$-$C_6$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, more preferably $C_1$-$C_4$-alkyl such as methyl, ethyl, n-propyl, iso-propyl, n-butyl, isobutyl, sec-butyl and tert-butyl;

$C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl, and cycloheptyl.

In one particular embodiment the radicals $R^7$ and $R^8$ are bonded covalently to one another to form a 4- to 13-membered ring. Thus, for example, $R^7$ and $R^8$ may together be —$(CH_2)_4$—, —$(CH_2)_5$—, —$(CH_2)_6$—, —$(CH_2)_7$—, —CH($CH_3$)—$CH_2$—$CH_2$—CH($CH_3$)— or —CH($CH_3$)—$CH_2$—$CH_2$—$CH_2$—CH($CH_3$)—.

Particularly preferred regulators are propionaldehyde, acetone, and ethyl methyl ketone.

Examples of suitable regulators further include-alkylaromatic compounds, examples being toluene, ethylbenzene or one or more isomers of xylene. Examples of highly suitable regulators further include paraffins such as, for example, isododecane (2,2,4,6,6-pentamethylheptane) or isooctane.

Initiators which can be used for the free-radical copolymerization are the typical free-radical initiators such as organic peroxides, oxygen or azo compounds, for example. Mixtures of two or more free-radical initiators are suitable as well.

Suitable peroxides, selected from commercially available substances, are
  didecanoyl peroxide, 2,5-dimethyl-2,5-di(2-ethylhexanoylperoxy)hexane, tert-amyl peroxypivalate, tert-butyl peroxypivalate, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbonyl)cyclohexane as an isomer mixture, tert-butyl perisononanoate, 1,1-di(tert-butylperoxy)-3,3,5-trimethylcyclohexane, 1,1-di(tert-butylperoxy)cyclohexane, methyl isobutyl ketone peroxide, tert-butyl peroxyisopropyl carbonate, 2,2-di(tert-butylperoxy)butane or tert-butyl peroxyacetate;
  tert-butyl peroxybenzoate, di-tert-amyl peroxide, dicumyl peroxide, the isomeric di(tert-butylperoxyisopropyl) benzenes, 2,5-dimethyl-2,5-di-tert-butylperoxyhexane, tert-butyl cumyl peroxide, 2,5-dimethyl-2,5-di(tert-butylperoxy)hex-3-yne, di-tert-butyl peroxide, 1,3-diisopropylbenzene monohydroperoxide, cumene hydroperoxide or tert-butyl hydroperoxide; or
  dimeric or trimeric ketone peroxides, as known from EP-A 0 813 550.

Particularly suitable peroxides are di-tert-butyl peroxide, tert-butyl peroxypivalate, tert-butyl peroxyisononanoate or dibenzoyl peroxide or mixtures thereof. As an example of an azo compound mention may be made of azobisisobutyronitrile (AIBN). Free-radical initiators are metered in amounts typical for polymerizations.

Numerous commercially available organic peroxides are admixed with what are called phlegmatizers before being sold, in order to improve their handling qualities. Examples of suitable phlegmatizers include white oil or hydrocarbons such as isododecane in particular. Under the conditions of the high-pressure polymerization it is possible that such phlegmatizers may have a molecular weight regulator effect. For the purposes of the present invention the use of molecular weight regulators is intended to imply the additional use of further molecular weight regulators beyond the use of the phlegmatizers.

The proportion of the comonomers in the case of metered addition typically does not correspond exactly to the proportion of the units in the copolymers of the invention, since alkenylphosphonic diesters (c) are generally incorporated more readily into copolymers than is ethylene.

Comonomers (a), (c), and, if appropriate, (d) are typically metered together or separately.

Comonomers (a), (c), and, if appropriate, (d) can be brought to the polymerization pressure using a high-pressure pump. In another embodiment the comonomers (a), (c), and, if appropriate, (d) are brought first to an increased pressure of 150 to 400 bar, for example, preferably 200 to 300 bar, and in particular 260 bar, using a compressor, and are then brought to the actual polymerization pressure using a further compressor. In another embodiment the comonomers (a) are first brought to an increased pressure of 150 to 400 bar, for example, preferably 200 to 300 bar, and in particular 260 bar, by means of a compressor, and are then brought to the actual polymerization pressure with a further compressor, and the comonomers (c) and, if appropriate, (d) are at the same time brought to the polymerization pressure with a high-pressure pump.

The copolymerization may be carried out alternatively in the absence and in the presence of solvents—mineral oils, white oil, and other solvents present during the polymerization in the reactor and used for the purpose of phlegmatizing the free-radical initiator or initiators are not considered solvents for the purposes of the present invention. Examples of suitable solvents include toluene, isododecane, and isomers of xylene. acetone, and methyl ethyl ketone.

After the copolymerization it was possible, for example, to remove uncopolymerized comonomer (a), (c) and/or, if appropriate, (d).

The copolymerization described above produces a copolymer which in the context of the present invention is also referred to as a precursor copolymer.

The copolymerization of (a), (c), and, if appropriate, (d) is followed by at least partial hydrolysis of copolymerized alkenylphosphonic diester (c).

In one embodiment of the present invention the at least partial hydrolysis is carried out such that precursor copolymer is reacted with one or more inorganic hydroxides, preferably alkali metal hydroxides, especially sodium hydroxide or potassium hydroxide, in bulk or, preferably, in organic solvent or in water, or in a mixture of organic solvent and water. In one embodiment of the present invention the at least partial hydrolysis is carried out such that precursor copolymer is reacted with ammonia or an organic amine in a mixture of organic solvent and water, or in water. In one embodiment of the present invention the at least partial hydrolysis is carried out such that precursor copolymer is reacted with ammonia or an organic amine in bulk or an organic solvent and then treated with water.

In another embodiment of the present invention the at least partial hydrolysis is carried out such that precursor copolymer is reacted with one or more acids, preferably hydrochloric acid, sulfuric acid, phosphoric acid, p-toluenesulfonic acid, and methanesulfonic acid, in the presence of water and, if appropriate, of an organic solvent.

In one embodiment of the present invention precursor copolymer is reacted at a temperature in the range from 60 to 150° C., more preferably 75 to 120° C.

In one embodiment of the present invention precursor copolymer is reacted under atmospheric pressure. In another embodiment of the present invention precursor copolymer is reacted at a pressure in the range from 1.1 to 20 bar, in an autoclave for example.

In one embodiment of the present invention precursor copolymer is reacted in an organic solvent selected from alcohols, diols such as ethylene glycol, ethers, toluene, xylene, and dimethyl sulfoxide; preference is given to $C_1$-$C_4$-alkanols such as, for example, methanol, ethanol, n-propanol, and n-butanol, and with particular preference isopropanol.

The weight ratio of precursor copolymer to organic solvent can be 20:1 to 1:20.

The weight ratio of precursor copolymer to water can be 1:1 to 1:100.

The reaction time for the partial hydrolysis can be, for example, 30 minutes to 30 hours.

In one embodiment of the present invention, based on alkenylphosphonic ester (c) copolymerized in precursor copolymer, 0.1 equivalent to 100 equivalents, preferably 1 equivalent to 10 equivalents, of hydroxide, ammonia or organic amine are employed.

In one embodiment of the present invention inorganic hydroxide serves simultaneously as neutralizing agent.

Without wishing to be tied to any particular theory, the authors are unable to rule out the formation, in those cases where ammonia or a primary amine is employed in the hydrolysis, of compounds containing P—N bonds as intermediates.

The present invention further provides for the use of copolymer of the invention for treating surfaces. Additionally provided by the present invention is a method of coating surfaces using copolymer of the invention, also referred to below as treatment method of the invention.

Treatment method of the invention is carried out starting from one or more surfaces, which may be of any desired material. Preferred material comprises plastics, more preferably single-phase or multiphase polymer blends or compound formulations, in particular with engineering thermoplastic fractions such as, for example, polyethylene, polypropylene, polystyrene, polyamides, polyacrylonitrile, PMMA, and metals, the term "metals" for the purposes of the present invention also comprising alloys. Particularly suitable alloys are those with predominantly iron, aluminum, nickel, chromium, copper, titanium, zinc, tin, magnesium, and cobalt, a particularly suitable alloy being steel, such as chromium-nickel steel, stainless steel or else galvanized steel, for example. Surfaces composed of one or more of the above metals may be a coating fully or partly covering a surface of another metal, wood or plastic.

Surfaces for inventive treatment may adopt any desired forms: they may be planar or curved, and they may be interior or exterior surfaces of one or more articles.

Surfaces for inventive treatment may be smooth, and in particular may have a smooth appearance to the naked human eye, or else may be textured—for example, they may have elevations or depressions, in dot format or in the form of grooves, for example.

The treatment method of the invention can be implemented for example as follows:

In one embodiment of the present invention a possible procedure is to wet a metal surface or polymer surface with a solution of copolymer of the invention. For this purpose one possible procedure, for example, is to dissolve or disperse or emulsify copolymer of the invention in a liquid, such as in an organic solvent or in water, for example, and then to contact it with the surface to be treated. In this embodiment the subsequent drying of the inventively treated surface is omitted.

In one embodiment the surface to be treated is the interior surface of an installation serving as a cooling circuit, in automobiles or power stations for example. If it is desired to treat, inventively, surfaces of installations which serve as cooling circuits, then copolymer of the invention can be dissolved, dispersed or emulsified in a liquid, which may serve at the same time as a constituent of the coolant or coolants, salt solution for example, and the solution, dispersion or emulsions may be fed into the cooling circuit. Suitable concentrations of copolymer of the invention in the overall liquid serving as coolant are for example 0.05% to 30%, preferably 0.1 to 10%, by weight. Copolymer of the invention may be fed in at one time or continuously or periodically. Where surfaces of installations which serve as cooling circuits are treated inventively, a corrosion inhibition effect is observed.

In one embodiment of the present invention the cooling circuits in question are constituents of refrigerators or deep-freezers.

In one embodiment of the present invention a metal surface or plastics surface is wetted in the course of drilling, milling, turning, cutting, abrading, threading or rolling and/or drawing with solution of copolymer of the invention.

In another embodiment of the present invention a metal surface or polymer surface, which may be unpretreated or pretreated, is provided with a layer of inventive copolymer. For this purpose one possible procedure, for example, is to apply inventive copolymer in the form of a film to the surface to be treated, and thereafter to dry it. In the course of drying, the film of copolymer of the invention may cure.

Inventively pretreated or unpretreated metal or polymer surfaces are preferably surfaces of base metals, such as surfaces of iron, steel, zinc or zinc alloys, aluminum or aluminum alloys, tin or tin alloys, magnesium or magnesium alloys, for example. Steels may be either low-alloy steels or high-alloy steels.

The method of the invention is particularly suitable for passivating surfaces of zinc, zinc alloys, aluminum or aluminum alloys. These may be surfaces of workpieces or elements composed entirely of the aforementioned metals and/or of the aforementioned alloy. Alternatively they may be surfaces of workpieces or elements coated with zinc, zinc alloys, aluminum or aluminum alloys, the elements or workpieces in question being composed of other materials, such as-of other metals, alloys, polymers or composites, for example. The surface in question may in particular be that of galvanized iron or steel. The term "galvanized" also embraces coating with a zinc alloy, especially hot-dip galvanizing with ZnAl alloys and electrolytic galvanizing with ZnNi, ZnFe, ZnMn alloys and ZnCo alloys.

Zn alloys or Al alloys are known to the skilled worker. Typical constituents of zinc alloys comprise, in particular, Al, Mg, Pb, Si, Mg, Sn, Cu or Cd. The alloys in question may also be Al/Zn alloys in which Al and Zn are present in approximately equal amounts. Coatings may be largely homogeneous coatings or else coatings which exhibit concentration gradients. By way of example the substrate in question may comprise galvanized steel which has been given an additional vapor coating with Mg. By this means it is possible for a Zn/Mg alloy to be produced on the surface. Typical constituents of aluminum alloys comprise, in particular, Mg, Mn, Si, Zn, Cr, Zr, Cu or Ti.

In one preferred embodiment of the method of the invention the surface in question is that of a coil metal, preferably of aluminum or aluminum alloys or iron or steel, especially coils of electrolytically galvanized or hot-dip-galvanized steel.

The surface it is desired to treat inventively with copolymer of the invention, particularly a surface of metal, may first of all be pretreated, for example, cleaned, especially degreased and/or deoiled. In many embodiments degreasing or deoiling also comprises one or more prior preliminary cleaning steps. After the preliminary cleaning step carried out if appropriate, contaminating grease or oil, which may have formed, for example, in the form of spots or of an oil or grease layer, is removed in the actual cleaning step by means of at least one cleaning bath, by immersion for example, or by means of at least one cleaning agent for application to the surface to be cleaned, it being possible to apply said agent by spraying, by pouring over the surface to be cleaned, or by squirting using, for example, a hose. The residues of cleaning bath or cleaning agent can be removed subsequently, with one or more successive rinsing baths, for example, and finally the surface is dried. Degreasing and deoiling baths must be disposed of at regular intervals. For disposal the grease or oil accumulated in the degreasing or deoiling bath is separated off from the aqueous phase in a further operation. Owing to the presence of surfactants in the degreasing or deoiling bath, further chemicals (demulsifiers, breakers) are required as auxiliaries for the disposal. Details of the degreasing and deoiling of metals and also of useful formulations and apparatus for the purpose are set out for example under the keyword "Metals, Surface Treatment" in Ullmann's Encyclopedia of Industrial Chemistry, 6th edition, 2000, Wiley-VCH-Verlag GmbH, Weinheim, Germany.

In one embodiment degreasing or deoiling is carried out with an aqueous cleaning or degreasing bath, preferably in an alkaline cleaning bath or an alkaline degreasing bath which comprise as surfactant one or more sulfated polyalkoxylated fatty alcohols or one or more sulfated polyalkoxylated phenols, having in each case, for example, a molecular weight $M_n$ in the range from 800 to 3000 g/mol, in a concentration which may be, for example, in the range from 0.01% to 20%, preferably 0.02% to 10%, and more preferably at least 0.1% by weight. Alkaline cleaning or degreasing bath employed may for example have a pH in the range from 8 to 14, preferably at least 9, and more preferably 11 to 13.

Cleaning and degreasing baths, especially alkaline cleaning and degreasing baths, may have a temperature in the range from 10 to 80° C.

The cleaning or degreasing or deoiling can be carried out, for example, over a period in the range from 0.1 to 30 seconds.

Subsequent to any pretreatment carried out if appropriate, copolymer of the invention is applied to the surface to be treated inventively. This can be done making use of common techniques. By way of example it is possible to apply a formulation, selected from solutions, dispersions or emulsions of copolymer of the invention, or a melt of copolymer of the invention, but preferably a dispersion, to a surface which has been pretreated if appropriate, and thereby to produce a layer of copolymer of the invention. In accordance with the invention a nonuniform or, preferably, uniform layer thickness of copolymer of the invention may be provided.

In one embodiment of the present invention the application may be performed as squirting, spraying, dipping, knife coating, rolling, brushing or electrophoretic coating.

The layer thickness of copolymer of the invention may be for example in the range from 10 nm to 100 μm, preferably 100 nm to 10 μm. The layer thickness of copolymer of the invention may be influenced by way for example of the nature and amount of the applied components and also the exposure time. It is preferred to adjust the layer thickness of copolymer of the invention by way of the concentration of copolymer of the invention in the preferably aqueous formulation that is used for coating. It may additionally be influenced by technical parameters, such as by removing excess applied formulation using blades or rollers, for example. The layer thickness in the context of the present invention is measured after drying, and can be determined gravimetrically or by means of X-ray fluorescence (phosphorus).

Copolymer of the invention for the purpose of coating is preferably applied as a formulation in a suitable solvent or a mixture of different solvents. Particular preference is given to using water as sole solvent. Further components of a mixture of different solvents comprise, in particular, water-miscible solvents. The following may be mentioned by way of example: monoalcohols such as methanol, ethanol or propanol, higher alcohols such as ethylene glycol or polyether polyols and ether alcohols such as n-butyl glycol or methoxypropanol. A preferred mixture of water with organic solvents comprises at least 75%, more preferably at least 85%, and very preferably at least 95% by weight of water. The figures refer in each case to the total amount of solvents used for preparing the formulation in question.

Copolymer of the invention can be dissolved, emulsified or dispersed in solvent or solvent mixture. The method of the invention is preferably carried out using a dispersion of copolymer of the invention, which is likewise provided by the present invention. The concentration of copolymer of the invention may for example be 0.1% to 40%, preferably 1% to 30%, and more preferably 3% to 25% by weight. The aforementioned quantity figures refer to the sum of all of the components of the formulation. Copolymer of the invention is preferably formulated in water as sole solvent, and the concentration of copolymer of the invention is preferably in the range from 0.5% to 40% by weight.

It is also possible to employ mixtures of two or more copolymers of the invention.

As well as the stated solvent and inventive copolymer components, the formulation of the invention may further comprise additional components, which in the context of the present invention are also referred to as adjuvants. Adjuvants may be, for example, organic or inorganic acids which may serves as neutralizing agent or as buffer. Further adjuvants used optionally comprise surface-active compounds (dispersants, emulsifiers, surfactants), corrosion inhibitors such as antioxidants, for example, hydrotropic agents, frost preventatives, biocides, complexing agents, carriers, waxes, metal salts, bases, and further polymers other than inventive copolymer. One adjuvant may have more than just one function in such a formulation.

Surface-active compounds for naming by way of example include surfactants, emulsifiers and/or dispersants, which may be cationic, anionic, zwitterionic or nonionic. Suitable surfactants are, for example, alkyl alkoxylates and alkenyl alkoxylates of the type $R^9\text{-EO}_v/\text{PO}_w$, where radicals $R^9$ are generally linear or branched $C_6$-$C_{30}$-alkyl or alkenyl radicals, preferably $C_8$-$C_{20}$-alkyl radicals, and EO is an ethylene oxide unit and PO is a propylene oxide unit, it being possible for EO and PO to be arranged in any order, including randomly, and v and w may be identical or different or, preferably, different and are preferably ≤100, with the proviso that v and w are not simultaneously zero; preferably v or w is in the range from 3 to 50. Examples of commercially available nonionic surfactants are Emulan®, Lutensol®, and Plurafac® from BASF Aktiengesellschaft. Further examples are alkylphenol ethoxylates, EO/PO block copolymers such as $EO_7PO_8EO_7$, for instance. Examples of suitable anionic surfactants are $R^9EO_vSO_3Na$ and $R^9EO_vSO_3K$. Examples of suitable cationic surfactants are alkylammonium salts, such as sulfates or halides of $R^9N(CH_3)_3$, known as quats.

Corrosion inhibitors for naming by way of example include butynediol, benzotriazole, aldehydes, amine carboxylates, benzotriazoles, benzotriazole derivatives such as methylenebenzotriazole and 2-mercaptobenzotriazole, aminophenols and nitrophenols, amino alcohols such as, for example, triethanolamine, aminobenzimidazole, imidazolines, aminoimidazolines, aminotriazole, benzimidazolamines, benzothiazoles, boric esters with alkanolamines, such as boric acid diethanolamine ester, carboxylic acids and their esters, quinoline derivatives, dibenzyl sulfoxide, dicarboxylic acids and their esters, diisobutenylsuccinic acid, dithiophosphonic acid, fatty amines and fatty acid amides, guanidine and guanidine derivatives, urea and urea derivatives, laurylpyridinium chloride, maleamides, mercaptobenzimidazole, N-2-ethyl-hexyl-3-aminosulfopropionic acid, phosphonium salts, phthalamides, amine- and sodium-neutralized phosphoric monoesters and diesters of $C_1$-$C_{20}$-alkyl alcohols and also the corresponding phosphoric esters themselves, phosphoric esters of polyalkoxylates and especially of polyethylene glycol, polyetheramines, sulfonium salts, sulfonic acids such as, for example, methanesulfonic acid, thioethers, thioureas, thiuramide sulfides, cinnamic acid and its derivatives, zinc phosphates and zinc silicates, zirconium phosphates and zirconium silicates. Corrosion inhibitors—if employed in compositions of the invention—are employed in an amount of generally 0.01 to 50 g/l, preferably 0.1 to 20 g/l, more preferably 1 to 10 g/l.

Dispersants can be used in unstabilized or stabilized form with one or more thickeners. Examples of suitable thickeners include unmodified or modified polysaccharides of xanthan, alginate, guar or cellulose type. Particularly suitable modified polysaccharides are methylcellulose and carboxymethylcellulose.

Hydrotropic agents to be named by way of example include urea and sodium xylenesulfonate.

Frost preventatives for naming by way of example include ethylene glycol, propylene glycol, diethylene glycol, glycerol, and sorbitol.

Biocides for naming by way of example include 2-bromo-2-nitropropane-1,3-diol, glutaraldehyde, phenoxyethanol, and phenoxypropanol, glyoxal, 2,4-dichlorobenzyl alcohol, chloroacetamide, formalin, 1,2-benzisothiazolin-3-one, silver, and polyvinyl-pyrrolidone-iodine.

Complexing agents for naming by way of example include, for example, nitrilotriacetic acid, ethylenediaminetetraacetic acid, methylglycinediacetic acid, diethylenepentamine-pentaacetic acid, and also their respective salts, especially alkali metal salts.

Suitable carriers are polycarboxylic acids, such as poly(meth)acrylic acid or polymaleic acid, if appropriate in partially or fully neutralized form, partially or fully hydrolyzed polyacrylonitrile, polyacrylamide, copolymers of polyacrylamide, lignosulfonic acid and its salts, starch, starch derivatives (e.g., oxidized starch), cellulose, $C_1$-$C_{10}$-alkyl-phosphonic acid, and 1-aminoalkyl-1,1-diphosphonic acid.

Metal salts for naming by way of example include phosphates. These may be dissolved or particulate phosphates. They may for example be orthophosphates, hydrogen phosphates, dihydrogen phosphates, or diphosphates (pyrophosphates). Examples of suitable phosphates comprise $Zn_3(PO_4)_2$, $Zn(H_2PO_4)_2$, $Mg_3(PO_4)_2$ or $Ca(H_2PO_4)_2$ and corresponding hydrates thereof.

Acids for naming by way of example include phosphoric acid, phosphorous acids, methanephosphonic acid, and phosphonic acid.

Polymers other than copolymer of the invention that may be named by way of example include polyacrylates, polyurethanes, and polyamides, each preferably in aqueous solution or in aqueous dispersion form.

In one particularly preferred embodiment a formulation of the invention comprises at least one dispersed wax. The term "wax" is known to the skilled worker and is defined for example in Römpp Lexikon der Chemie, keyword "Paints and Printing Inks", Georg Thieme Verlag, Stuttgart, New York 1998, pp. 615/616 or Ullmann's Encyclopedia, 6th edition, keyword "Waxes; 1.2. Definition", and the term comprises fluorinated waxlike substances such as those known as PTFE waxes, for example (see, e.g., Römpp, op. cit., pages 466/467).

Preferred waxes are oligomeric or polymeric substances having a molecular weight $M_w$ of 1000 to 100 000 g/mol, more preferably 2000 to 30 000 g/mol.

In one embodiment of the present invention preferred waxes have a weight fraction totaling at least 50% by weight of structural elements selected from the group of ($-CH_2-CH_2-$), ($-CH_2-CH<$), ($-CH_2-CH(CH_3)-$), ($CH_3$), $[C(R^8)_2-C(R^8)_2]$, and $[C(R^8)_2-C(R^8)(C(R^8)_3)]$, it being possible for $R^8$ to be identical or different, and $R^8$ being H or F, and with the proviso that the aforesaid structural elements are joined to one another in such a way that they comprise predominantly units of at least 12 carbon atoms directly linked to one another. It will be appreciated that a mixture of different waxes can be used.

Waxes may also have acid functions, especially carboxylic acid groups, which may be in neutralized or non-neutralized form. Waxes having an acid number ≤200 mg KOH/g, determined in accordance with DIN 53402, are preferred. Particularly preferred waxes are those having an acid number in the range from 10 to 190 mg KOH/g. Waxes which have a melting point are preferred. Particular preference is given to waxes having a melting point of 40 to 150° C. Waxes having a melting point in the range from 50 to 120° C. are especially preferred.

Examples of particularly suitable waxes for performing the present invention comprise [CAS numbers in square brackets]:
  polyethylene wax [9002-88-4],
  paraffin wax [8002-74-2],
  montan wax and montan raffinates, e.g. [8002-53-7],
  polyethylene-polypropylene waxes,
  polybutene waxes,
  Fischer-Tropsch waxes,
  carnauba waxes,
  oxidized waxes, such as oxidized polyethylene wax corresponding to [68441-17-8],
  copolymeric polyethylene waxes, examples being copolymers of ethylene with acrylic acid, methacrylic acid, maleic anhydride, vinyl acetate, vinyl alcohol, for example [38531-18-9], [104912-80-3], [219843-86-4] or copolymers of ethylene with two or more of the aforementioned monomers,
  polar modified polypropylene waxes, for example [25722-45-6], microcrystalline waxes, examples being microcrystalline paraffin waxes [63231-60-7], montanic acids, for example [68476-03-9], metal salts of montanic acids, such as sodium salts [93334-05-5] and calcium salts [68308-22-5], esters of long-chain carboxylic acids with long-chain alcohols, an example being n-octadecyl stearate [2778-96-3], montanic esters of polyhydric alcohols, examples being montan wax glycerides [68476-38-0], including those with partial hydrolysis, montanic esters of trimethylolpropane [7313848-4], montanic esters of 1,3-butanediol [73138-44-0], including those with partial hydrolysis, montanic esters of ethylene glycol [73138-45-1], including those with partial hydrolysis, montan wax ethoxylates, for example [68476-04-0], fatty acid amides, examples being Erucamid [112-84-5], oleamide [301-02-0], and 1,2-ethylenebis(stearamide) [110-30-5]

long-chain ethers, n-octadecyl phenyl ether for example.

Mixtures of waxes are additionally suitable, examples being mixtures of n-octadecyl stearate and partially hydrolyzed montanic esters of polyhydric alcohols mixtures of paraffin waxes and partially hydrolyzed montanic esters of polyhydric alcohols and/or montanic acids mixtures of polyethylene wax and polyethylene glycol Particularly preferred waxes are those which can be incorporated with particular ease into a formulation of the invention, such as micronized waxes and/or wax dispersions, for example.

Micronized waxes for the purpose of the present invention are particularly fine-particled powders having an average particle diameter preferably below 20 μm, more preferably 2 to 15 μm. Wax dispersions are aqueous preparations of waxes which comprise water, optionally further, water-miscible solvents, spherical wax particles, and, generally, one or more auxiliaries. Preferred wax dispersions for use in the context of the present invention have an average particle diameter below 1 μm, preferably 20 to 500 nm, more preferably 50 to 200 nm. Micronized waxes and wax dispersions are available commercially.

Auxiliaries are used in wax dispersions in order for example to ensure the dispersibility of the wax and its stability on storage. Auxiliaries may be, for example, bases for full or partial neutralization of acid functions in the wax, examples being alkali metal hydroxides, ammonia, amines or alkanolamines. Acid groups may also be fully or partly neutralized with cations, examples being $Ca^{++}$ or $Zn^{++}$. Further possible auxiliaries are surface-active substances, preferably nonionic or anionic surfactants. Examples of nonionic surfactants comprise ethoxylates and propoxylates based on alcohols and hydroxyaromatics and also their sulfation and sulfonation products. Examples of anionic surfactants comprise alkylsulfonates, arylsulfonates, and alkylarylsulfonates.

Particularly suitable for performing the present invention are wax dispersions having a pH in the range from 8 to 11.

In accordance with the invention wax is used in an amount of 0.01% to 60%, preferably 0.1% to 40%, more preferably 0.25% to 20%, very preferably 0.5% to 10%, and for example 1% to 5% by weight, based in each case on the formulation of the invention as a whole.

In one embodiment of the invention formulations of the invention comprise in total in the range from 0.01 to 600 g/l, preferably 0.1 to 100 g/l, of adjuvant(s).

The duration of the treatment with copolymer of the invention may be in the range of significantly less than one second up to a number of minutes: for example, in the range from 0.1 second to 10 minutes. In the case of a continuous method it has been found particularly appropriate to contact the surface under treatment with copolymer of the invention for a duration of 1 to 60 seconds.

In one specific embodiment of the present invention, copolymer of the invention is formulated into a powder coating material and is applied to the surface to be treated inventively in accordance with a powder coating process.

In one version of the method of the invention a metal surface or polymer surface, which may be unpretreated or pretreated, is provided with a layer of copolymer of the invention and thereafter with a further coating material, such as a paint, in particular a powder coating material. In one specific version a metal surface or plastics surface is first coated with copolymer of the invention and subsequently a powder coating is applied.

If the desire is to effect the coating of the invention by dipping, then the coating takes place at a relevant dip bath temperature in the range from 15 to 90° C., preferably 25 to 80° C., and more preferably 30 to 60° C. For this purpose the dipping bath comprising formulation comprising copolymer of the invention can be heated. If it is desired in accordance with the invention to coat articles which have a metal surface, an elevated temperature may also come about automatically by the immersion of the hot metal in question into the dipping bath comprising formulation comprising copolymer of the invention.

If the desire is to carry out the method of the invention by spraying, squirting, brushing, knife coating, rolling or electrophoretic coating, then it is possible to operate with preference at a temperature in the range from 15 to 40° C., preferably 20 to 30° C.

The method of the invention can be performed batchwise or, preferably, continuously. A discontinuous method may relate for example to a dipping method for piece goods, where the piece goods may be suspended from racks or may be present as loose product within perforated drums. A continuous method is especially suitable for treating coil metals. The coil metal in this case is passed through a tank or a spraying apparatus with a formulation comprising copolymer of the invention, and also, optionally, through further pretreatment or aftertreatment stations.

In one version of the method of the invention the metal surface or polymer surface is treated in accordance with a continuous coil process.

The actual application of copolymer of the invention is followed by drying. Drying may take place at room temperature by simple evaporation in air at room temperature.

Drying can also be assisted by means of suitable auxiliary means and/or auxiliary measures, such as by heating and/or by passing gas streams, especially air streams, over the drying systems, in particular by means of drying in a drying tunnel. Drying may also be assisted by means of IR lamps. It has been found appropriate to carry out drying at a temperature of 40° C. to 160° C., preferably 50° C. to 150° C., and more preferably 70° C. to 130° C. The temperature referred to is that on the polymer or metal surface; it may be necessary to set a higher dryer temperature.

Drying itself may be preceded by allowing the article bearing the surface coated with copolymer of the invention to drip dry, in order to remove excess formulation. When the article bearing surfaces coated with copolymer of the invention comprises metal sheets or metal foils, excess formulation can be removed by squeegee or blade stripping, for example.

It is possible to rinse the surface with a cleaning liquid, in particular with water, after the treatment of the invention but prior to drying, in order to remove excess residues of the formulation employed from the surface treated inventively. Thereafter drying takes place.

It is also possible to carry out drying in the manner of what is called a "no-rinse" operation. Formulation comprising copolymer of the invention is dried immediately after its application, without prior rinsing, in a drying oven.

Through the inventive treatment of surfaces with copolymer of the invention, fractions at least of copolymer of the invention, and also, if appropriate, further components of the formulation, are chemisorbed by the surface of the polymer or metal and/or react with the surface, so that a firm bond comes about between surface and copolymer of the invention.

Surfaces coated in accordance with the invention can be provided, in a way which is known in principle, with one or more coating films applied atop one another. These may be, for example, color or effect coating films. Typical coating materials, their composition, and typical film sequences in the case of two or more coating films, are known per se. The inventively applied coating is in many cases observed to be readily overcoatable with commercially customary coating materials.

In one embodiment of the present invention the surface that is desired to coat, which may or may not have been pretreated, is coated with what is called a primer before the coating operation proper. Primers for naming by way of example include polyamines and polyethyleneimines. This is followed by coating with copolymer of the invention, as described above. In this case a layer thickness of copolymer of the invention preferably in the range from ≥4 μm to 100 μm is set. After that it is possible to provide one or more coating films.

In another embodiment of the present invention copolymer of the invention is applied as a primer, with a layer thickness for example in the range from 50 nm to 50 μm, preferably 100 nm to 10 μm, and with very particular preference from 300 nm to 3 μm. After that it is possible to apply one or more coating films.

In another embodiment of the present invention copolymer of the invention is applied as a coating material or constituent of a coating material, preferably to an unpretreated surface of metal. In this embodiment a copolymer of the invention layer thickness in the range from 100 nm to 3 μm is preferred.

The present invention further provides polymer surfaces or metal surfaces coated with copolymer of the invention comprising as comonomers in copolymerized form:
(a) ethylene,
(b) one or more compounds of the general formula I, as defined above,
(c) one or more alkenylphosphonic diesters,
(d) if appropriate, one or more other free-radically copolymerizable comonomers.

The present invention further provides articles having at least one surface according to the invention.

Surfaces of the invention and, accordingly, articles with surfaces according to the invention feature particularly good corrosion protection, having, for example, improved oxidative corrosion stability with respect to solid, liquid, and gaseous oxidant media.

The present invention further provides aqueous formulations, such as aqueous solutions, aqueous emulsions, and, in particular, aqueous dispersions, comprising 0.01% to 40% by weight of copolymer of the invention comprising as comonomers in copolymerized form:
(a) ethylene,
(b) one or more compounds of the general formula I, as defined above,
(c) if appropriate, one or more alkenylphosphonic diesters,
(d) if appropriate, one or more other free-radically copolymerizable comonomers.

In one embodiment of the present invention it is possible for aqueous formulations of the invention to comprise at least one adjuvant selected from dispersants, surfactants, corrosion inhibitors, antioxidants, biocides, waxes, complexing agents, metal salts, acids, and bases.

WORKING EXAMPLES

I. Preparation of Precursor Copolymers

I.1 Preparation of precursor copolymer (A.1) to (A.5) and also (A.11) and (A.12)

A high-pressure autoclave as described in the literature (M. Buback et at., *Chem. Ing. Tech.* 1994, 66, 510) was used to copolymerize ethylene, the amount of dimethyl vinylphosphonate II.1

II.1

Me = CH₃ specified in Table 1, either in bulk or as a solution in toluene (for concentration see Table 1), and methacrylic acid (Table 1). For this purpose ethylene (10.0 or 12.0 kg/h) was fed continuously into the high-pressure autoclave under a pressure of 1700 bar. Dimethyl vinylphosphonate was metered continuously into the high-pressure autoclave using a high-pressure pump under a pressure of 1700 bar. Separately therefrom the amount of methacrylic acid specified in Table 1 was first compressed to an intermediate pressure of 260 bar, using a compressor, and then fed continuously into the high-pressure autoclave, using a further compressor, under the reaction pressure of 1700 bar. Separately therefrom, the amount of initiator solution specified in Table 1, consisting of tert-amyl peroxypivalate (in isododecane; for concentration see Table 1), was fed continuously into the high-pressure autoclave under the reaction pressure of 1700 bar. Separately therefrom, the amount of propionaldehyde specified in Table 1 (in bulk or as a solution in isododecane; for concentration see Table 1) was first compressed to an intermediate pressure of 260 bar, using a compressor, and then fed continuously into the high-pressure autoclave, using a further compressor, under the reaction pressure of 1700 bar. The reaction-temperature was approximately 220° C. This gave precursor copolymer having the analytical data apparent from Table 2.

Examples (A.11) and (A.12) were carried out using a tube reactor as described in EP 0 101 343 (length: 595 m, internal diameter: 15/21 mm) having a length/diameter ratio of approximately 35,000 and including three positions for the metered addition of tert-amyl peroxypivalate. The course of the reaction is characterized by the maximum temperatures downstream of the positions at which tert-amyl peroxypivalate is metered. T11: 228/225/224° C., T12: 219/226/225° C.

I.2 Preparation of precursor copolymers (A.6 to (A.10))

A high-pressure autoclave as described in the literature (M. Buback et al., *Chem. Ing. Tech.* 1994, 66, 510) was used to copolymerize ethylene, the amount of dimethyl vinylphosphonate II.1

II.1

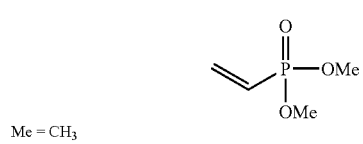

Me = CH₃ specified in Table 1, either in bulk or as a solution in toluene (for concentration see Table 1), and methacrylic acid (Table 1). For this purpose ethylene (10.0 kg/h) was fed continuously into the high-pressure autoclave under the reaction pressure of 1700 bar. Dimethyl vinylphosphonate was fed continuously into the high-pressure autoclave using a further compressor under the reaction pressure of 1700 bar. Separately therefrom the amount of methacrylic acid specified in Table 1 was first compressed to an intermediate pressure of 260 bar, using a compressor, and then fed continuously into the high-pressure autoclave, using a further compressor, under the reaction pressure of 1700 bar. Separately therefrom, the amount of initiator solution specified in Table 1, consisting of tert-amyl peroxypivalate (in isododecane; for concentration see Table 1), was fed continuously into the high-pressure autoclave under the reaction pressure of 1700 bar. Separately therefrom, the amount of propionaldehyde specified in Table 1 (in bulk or as a solution in isododecane; for concentration see Table 1) was first compressed to an intermediate pressure of 260 bar, using a compressor, and then fed continuously into the high-pressure autoclave, using a further compressor, under the reaction pressure of 1700 bar. The reaction temperature was approximately 220° C. This gave precursor copolymer having the analytical data apparent from Table 2.

TABLE 1

Preparation of precursor copolymer (A.1)-(A.12)

| No. | $T_{reactor}$ [° C.] | Ethylene [kg/h] | DVP [l/h] | DVP solution [l/h] | c(DVP) [% by vol.] | MAA [l/h] | PO in ID [l/h] | c(PO) | PA [l/h] | PA in ID [l/h] | c(PA) [% by vol] | Ethylene conversion [% by wt.] | DVP conversion [% by wt.] | Discharge (PCP) [kg/h] |
|---|---|---|---|---|---|---|---|---|---|---|---|---|---|---|
| (A.1) | 219 | 10 | — | 0.77 | 50 | — | 2.02 | 0.02 | 0.41 | — | — | 18 | 66 | 2.1 |
| (A.2) | 217 | 10 | — | 0.77 | 50 | — | 1.83 | 0.02 | — | 0.54 | 20 | 18 | 75 | 2.1 |
| (A.3) | 221 | 10 | 0.79 | — | — | — | 1.26 | 0.02 | 0.53 | — | — | 20 | 68 | 2.6 |
| (A.4) | 217 | 10 | 0.79 | — | — | — | 1.07 | 0.02 | — | 0.55 | 20 | 19 | 67 | 2.5 |
| (A.5) | 219 | 12 | 0.85 | — | — | — | 1.29 | 0.02 | — | 0.29 | 11 | 13 | 50 | 2.1 |
| (A.6) | 221 | 10 | — | 0.58 | 33 | 0.95 | 1.48 | 0.09 | 0.69 | — | — | 17 | 55 | 2.5 |
| (A.7) | 220 | 10 | — | 0.56 | 33 | 0.85 | 1.35 | 0.08 | — | 0.93 | 33 | 19 | 64 | 2.8 |
| (A.8) | 224 | 10 | — | 0.75 | 33 | 0.75 | 1.23 | 0.06 | 0.38 | — | — | 18 | 49 | 2.6 |
| (A.9) | 220 | 10 | 0.53 | — | — | 0.55 | 1.14 | 0.05 | 0.37 | — | — | 17 | 62 | 2.6 |
| (A.10) | 220 | 10 | 0.81 | — | — | 0.40 | 1.29 | 0.04 | 0.40 | — | — | 16 | 60 | 2.5 |
| (A.11) | T11 | 3200 | 140 | — | — | — | 17 | 0.5 | — | — | — | 23 | 98 | 870 |
| (A.12) | T12 | 3200 | 230 | — | — | — | 16 | 0.5 | — | — | — | 21 | 97 | 900 |

$T_{reactor}$ is the maximum internal temperature of the high-pressure autoclave.

Abbreviations: DVP: dimethyl vinylphosphate, ID: isododecane (2,2,4,6,6-pentamethylheptane), PO: tert-amyl peroxypivalate c(PO): concentration of PO in ID in mol/l, c(PA): concentration of PO in ID in % by weight, c(DVP): concentration of DVP in toluene in % by weight PCP: precursor copolymer, MAA: methacrylic acid

TABLE 2

Analytical data of precursor copolymer (A.1)-(A.11)

| No. | Ethylene content [% by wt.] | DVP content [% by wt.] | MAA content [% by wt.] | Ethylene content [mol %] | DVP content [mol %] | MAA content [mol %] | Acid No. [mg KOH/g] | v/mm²/s | $T_{melt}$ [° C.] | p [g/cm³] |
|---|---|---|---|---|---|---|---|---|---|---|
| (A.1) | 86.1 | 13.9 | — | 96.8 | 3.2 | — | — | 285 | 100.1 | 0.9438 |
| (A.2) | 84.2 | 15.8 | — | 96.3 | 3.7 | — | — | 5300 | 99.6 | 0.9439 |
| (A.3) | 76.4 | 23.6 | — | 94.0 | 6.0 | — | — | 220 | 73.9 | 0.9614 |
| (A.4) | 75.6 | 24.4 | — | 93.8 | 6.2 | — | — | 5000 | 89.0 | 0.9631 |
| (A.5) | 77.0 | 23.0 | — | 94.2 | 5.8 | — | — | 26900 | n.d. | n.d. |
| (A.6) | 67.1 | 4.9 | 27.9 | 86.9 | 1.3 | 11.8 | 181.7 | 5300 | 66.1 | n.d. |
| (A.7) | 68.6 | 4.9 | 26.5 | 87.7 | 1.3 | 11.0 | 172.4 | 19800 | 70.4 | n.d. |
| (A.8) | 71.1 | 5.4 | 23.5 | 89.0 | 1.4 | 9.6 | 152.9 | 5700 | 70.3 | n.d. |
| (A.9) | 67.3 | 14.4 | 18.3 | 88.3 | 3.9 | 7.8 | 119.4 | 5100 | 70.7 | n.d. |
| (A.10) | 64.9 | 22.2 | 12.9 | 88.1 | 6.2 | 5.7 | 84.3 | 4800 | 69.5 | n.d. |
| (A.11) | 84.2 | 15.8 | — | 96.3 | 3.7 | — | — | 5300 | 99.5 | 0.9439 |
| (A.12) | 75.5 | 24.5 | — | 93.7 | 6.3 | — | — | 5400 | 91.3 | 0.9636 |

The MAA content was determined by measuring the acid number in accordance with DIN 53402.
The ethylene and DVP content was determined by 1H NMR spectroscopy.
The phosphorus content was determined additionally for (A.6) and (A.10) by means of elemental analysis: (A.6): P = 1.1 g/100 g of precursor copolymer, corresponding to 4.8% by weight (1.3 mol %) DVP; (A.10): P = 4.9 g/100 g of precursor copolymer, corresponding to 21.6% by weight (6.0 mol %) DVP. The density was determined in accordance with DIN 53479. The melting point or melting range $T_{melt}$ was determined by DSC (differential scanning calorimetry) in accordance with DIN 51007.

II. Preparation of Copolymers of the Invention

II.1 Preparation of inventive copolymer CP-4.1

In a 2-liter round-bottomed flask 200 g of precursor copolymer (A.4) were heated under reflux with 550 g of isopropanol (initial charge 1). 200 g of initial charge 1 were stirred under reflux with 58.2 g of NaOH (approximately 2 equivalents, based on the methoxy groups of (A.4)) and 500 g of isopropanol. After an hour a further 200 g and after a further 2 h the remainder of initial charge 1 were added. The formation of a solid polymeric precipitate was observed. After 8 hours of boiling at reflux the mixture was cooled to room temperature, the solvent was decanted off from the solid polymeric precipitate. and in a 2-liter round-bottomed flask this precipitate was taken up in 1.4 liters of water at 95° to 98° C. The formation of an emulsion was observed. It was stirred at room temperature for 3 hours. Precipitation was carried out by adding 10% by weight of hydrochloric acid (to set a pH of approximately 3). The precipitated material was washed with water, isolated by filtration, and dried at 130° C. This gave 175 g of inventive copolymer CP-4.1, which according to $^1$H NMR still comprised 16% mol % of the methoxy groups originally present.

II.2 Preparation of inventive copolymer CP-4.2

In a cylindrical 2-liter pressure vessel of glass, 100 g of precursor copolymer (A.4) were heated to 126° C. over 2 h (3.5 bar) with 1 liter of isopropanol and 29.1 g of NaOH (approximately 2 equivalents, based on the methoxy groups of (A.4)), and the mixture was stirred at approximately 1700 revolutions per minute at 126° C. (3.5 bar) for about 2 h. After about a further hour the temperature had dropped to 114° C. and the pressure to 2.3 bar. The contents of the vessel were cooled to room temperature, let down to atmospheric pressure, and the precipitated solid was taken up in 1000 ml of water, to form an emulsion. Precipitation was carried out by adding 10% by weight of hydrochloric acid (to set a pH of approximately 3). The precipitated material was washed with water, isolated by filtration, and dried at 130° C. This gave 75 g of inventive copolymer CP-4.2, which according to $^1$H NMR still comprised 5 mol % of the methoxy groups originally present.

II.3 Preparation of Inventive Copolymer CP-6

In a 2-liter round-bottomed flask 147.2 g of precursor copolymer (A.6) were heated to 95° C. over 30 minutes with 25.7 g of NaOH (added in the form of 10% by weight aqueous sodium hydroxide solution) and a total of 563 g of water. The contents of the flask were stirred at 95° C. for a further 3.5 hours and then cooled to room temperature. After just an hour of stirring, the formation of an opaque emulsion was observed. On cooling to room temperature, a milky emulsion formed.

The milky emulsion thus obtained was diluted with water to twice its volume and acidified to a pH of 1.5 using 10% by weight hydrochloric acid, at which a white solid agglomerated and precipitated. The precipitated solid was comminuted mechanically, washed four times with water, separated off by decanting, and dried at 130° C. This gave 130 g of inventive copolymer CP-6.

Recording of a $^1$H NMR spectrum revealed that about 30 mol % of the methoxy groups of precursor copolymer (A.6) had been hydrolyzed.

II.4 Preparation of Inventive Copolymer CP-7

In the same way as in example II.3, 211.2 g of precursor copolymer (A.7) were hydrolyzed with 36.9 g of NaOH and a total of 805 ml of water. Precipitation with 10% by weight hydrochloric acid and workup gave 206 g of inventive copolymer CP-7. The recording of a $^1$H NMR spectrum revealed that about 38 mol % of the methoxy groups of precursor copolymer (A.7) had been hydrolyzed.

II.5 Preparation of Inventive Copolymer CP-10.1

In the same way as in example II.3, 173.9 g of precursor copolymer (A.10) were hydrolyzed with 34.2 g of NaOH and 750 ml of water. Only after 4.5 hours did an emulsion form, whose viscosity was higher than that of the emulsions from examples II.3 and II.4. It was diluted with a further 200 ml of water and stirred at 95° C. for a further hour.

Precipitation with dilute HCl (in the same way as in example II.3) and drying at 130° C. gave 165 g of inventive copolymer CP-10.1.

II.6 Preparation of Inventive Copolymer CP-6.3

200 g of precursor copolymer (A.6) were stirred for a total of 3.5 hours with 35.8 g of 25% by weight aqueous ammonia solution and 764 ml of water at 95° C., forming an emulsion. The emulsion thus obtained was filtered to remove small amounts of residue. This gave an approximately 20% by weight emulsion of inventive copolymer CP-6.3, for which a $^1$H NMR sample precipitated with diluted hydrochloric acid and worked up in the same way as in the preceding examples revealed that approximately 8 mol % of the methoxy groups of precursor copolymer (A.6) had been hydrolyzed.

II.7 Preparation of inventive copolymer CP-7.2

200 g of precursor copolymer (A.7) were stirred for a total of 5 hours with 35.8 g of 25% by weight aqueous ammonia solution and 764 ml of water at 95° C., forming an emulsion. The emulsion thus obtained was filtered to remove small amounts of residue. This gave an approximately 20% by weight emulsion of inventive copolymer CP-7.2, for which a $^1$H NMR sample precipitated with diluted hydrochloric acid and worked up in the same way as in the preceding examples revealed that approximately 8 mol % of the methoxy groups of precursor copolymer (A.7) had been hydrolyzed.

II.8 Preparation of Inventive Copolymer CP-10.2

200 g of precursor copolymer (A.10) were stirred for a total of 4 hours in a 2-liter round-bottomed flask with 40.5 g of 25% by weight aqueous ammonia solution and 1093 ml of water at 95° C., forming an emulsion. The emulsion thus obtained was filtered to remove small amounts of residue. This gave an approximately 15% by weight emulsion of inventive copolymer CP-10.2, for which a $^1$H NMR sample precipitated with diluted hydrochloric acid and worked up in the same way as in the preceding examples revealed that approximately 13 mol % of the methoxy groups of precursor copolymer (A.10) had been hydrolyzed.

In a further experiment it was found that a corresponding 20% by weight aqueous emulsion of inventive copolymer CP-10.2 became gel-like on cooling to room temperature.

III. Treatment of Surfaces, General Experimental Description

The inventive and comparative examples were carried out using metal test panels of Al 99.9, CuZn 37, Zn 99.8, galvanized steel (20 μm zinc topping on one side) or construction-grade steel St 1.0037.

In each case a 5% by weight aqueous solution of the respective copolymer of the invention was employed. The aqueous solution of the respective copolymer of the invention was homogenized and charged to a dip bath. The precleaned metal test panels were immersed for the stated time and then dried to constant weight at 80° C. Finally the edges of the coated panels were masked off in order to rule out edge effects in the context of the assessment.

The thickness of the passivation layer was determined by differential weighing before and after exposure of the metal surface to the inventively employed composition and on the assumption that the, layer has a density of 1 kg/l. "Layer thickness" below always refers to a parameter determined in this way, irrespective of the actual density of the layer.

The corrosion inhibition effect was determined by means of a salt spray test in a salt spray fog atmosphere in accordance with DIN 5002. The withstand time in the corrosion test is defined differently depending on the nature of the corrosion damage.

Where white spots with a diameter of in general more than 1 mm (Zn oxide or Al oxide, referred to as white rust) were formed, the withstand time reported was the time after which the apparent damage corresponds to rating 8 in DIN EN ISO 10289 of April 2001, annex B, page 19.

In the examples below, the following metal-panel pretreatments were selected if appropriate in order to ensure a chromium-free surface.

III.1 Pretreatment of Metal Test Panels, General Instructions

The metal test panels were pretreated in accordance with ISO 8407 for the specific material, the pretreatment being given here explicitly for St 1.0037.

III.1.1 Degreasing and Deoiling at Acidic pH

Unpassivated electrolytically galvanized metal test panels measuring 50 mm·20 mm·1 mm were immersed in an aqueous cleaning solution of 0.5% by weight of HCl and 0.1% by weight saturated $C_{13}$ oxo-process alcohol ethoxylated with an average of 9 equivalents of ethylene oxide, then rinsed off immediately with fully demineralized water, and subsequently dried by blowing with nitrogen.

III.1.2 Degreasing at Alkaline pH

Preparation of an alkaline degreasing bath:

In a plastic trough with two flat electrodes (stainless steel or graphite) which had a greater surface area than the metal test panel in question, a solution of a degreasing bath was used, with the following composition:

20 g NaOH
22 g $Na_2CO_3$
16 g $Na_3PO_4$·12 $H_2O$
1 g EDTA-$Na_4$
0.5 g saturated $C_{13}$ oxo-process alcohol ethoxylated with an average of 9 equivalents of ethylene oxide $[C_{13}(EO)_9]$
940 ml distilled water.

The alkaline degreasing bath was prepared by dissolving NaOH, $Na_2CO_3$ and $Na_3PO_4$ in distilled water in succession and with stirring. In parallel with this, $[C_{13}(EO)_9]$ and EDTA-$Na_4$ were dissolved separately in distilled water, at a temperature of 50° C. in the case of the EDTA-$Na_4$ solution. The aqueous solutions of $[C_{13}(EO)_9]$ and EDTA-$Na_4$ were subsequently added to the NaOH—$Na_2CO_3$—$Na_3PO_4$ solution in a graduated cylinder, cooled to room temperature, and made up to 1000 ml with distilled water.

Procedure for degreasing at alkaline pH:

A metal test panel measuring 50 mm·20 mm·1 mm was wiped down with a paper towel and immersed into the alkaline degreasing bath between the electrodes, at 10 volts, and connected as the cathode. The voltage was adjusted so that the current strength was 1 A. After ten seconds the metal test panel was removed from the alkaline degreasing bath and rinsed for five seconds under running, fully demineralized water.

III.2 Testing Instructions, General Procedure

First of all the metal test panel in question was pretreated in each case in accordance with (Cu test panels) or III.1.2 (steel test panels).

Thereafter the metal test panel was immersed in each case into a test solution at room temperature for 1 to 30 seconds, after which it was dried to constant weight at 80° C. and the increase in mass per unit area was determined gravimetrically by means of differential weighing. The value reported was the average from individual measurements for 3 different test panels. The test panels were prepared and cleaned in accordance with ISO 8407 in accordance with the specific material, and this preparation or cleaning is set out here explicitly for St 1.0037.

III.2.1 Coating of (CP-7) on St 1.0037

Metal test panels were immersed once for 10 seconds at room temperature in a 5% by weight solution of (CP-7).

Layer thickness: 3 μm.

The coated, test panel showed no changes in terms of color or metallic luster as compared with the untreated test panel.

Residence time to a rating of 8 in a 5% salt spray fog atmosphere at 30° C.: 10 hours.

III.2.2 Coating of (CP-4.2) on St 1.0037

Metal test panels were immersed once for 10 seconds in a 5% by weight ethanolic solution of (CP-4.2).

Layer thickness: 4 μm.

The coated test panel showed no changes in terms of color or metallic luster as compared with the untreated test panel.

Residence time to a rating of 8 in a 5% salt spray fog atmosphere at 30° C.: 15 hours.

III.2.3 Coating of (CP-6.3) on St 1.0037

Metal test panels were immersed once for 10 seconds in a 5% by weight aqueous solution of (CP-6.3).

Layer thickness: 2.9 μm.

The coated test panel showed no changes in terms of color or metallic luster as compared with the untreated test panel.

Residence time to a rating of 8 in a 5% salt spray fog atmosphere at 30° C.: 10 hours.

Comparative Example C1

"Blank" metal panel without coating

Residence time to a rating of 8 in a 5% salt spray fog atmosphere at 30° C.: less than 1 hour.

Comparative Example C2

Passivating Layer with $H_3PO_4$ (Phosphatizing)

Metal test panels were immersed once for 10 seconds in aqueous 0.1% or 0.5% or 1% by weight phosphoric acid.

Residence time to a rating of 8 in a 5% salt spray fog atmosphere at 30° C.: less than 2 hours in each case.

The invention claimed is:
1. A copolymer comprising as comonomers in copolymerized form:
(a) from 86.9 to 96.8 mol % ethylene,
(b) one or more compounds of the general formula I:

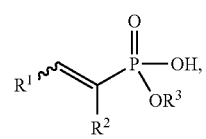

(c) one or more alkenylphosphonic diesters, and
(d) optionally, one or more other free-radically copolymerizable comonomers;
wherein $R^1$ is selected from hydrogen and unbranched and branched $C_1$-$C_{10}$-alkyl,
$R^2$ is selected from hydrogen and unbranched and branched $C_1$-$C_{10}$-alkyl, and $R^3$ is selected from phenyl, benzyl, unbranched and branched $C_1$-$C_{10}$-alkyl, and unbranched and branched hydroxy-$C_2$-$C_{10}$-alkyl;

wherein the copolymer is a free acid or is partially or completely neutralized with alkali metal, alkaline earth metal, ammonia or organic amine.

2. The copolymer according to claim 1, wherein the alkenylphosphonic diester (c) is a compound of the general formula II:

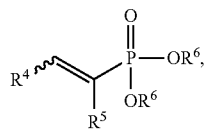

wherein $R^4$ is selected from hydrogen and unbranched and branched $C_1$-$C_{10}$-alkyl, $R^5$ is selected from hydrogen and unbranched and branched $C_1$-$C_{10}$-alkyl, and each $R^6$ is independently selected from phenyl, benzyl, and unbranched and branched $C_1$-$C_{10}$-alkyl, it being possible for the radicals $R^6$ to be joined to one another to form a 5-to 10-membered ring.

3. The copolymer according to claim 2, wherein $R^1$ and $R^4$ are identical and $R^2$ and $R^5$ are identical.

4. The copolymer according to claim 1, wherein the other free-radically copolymerizable comonomers (d) are selected from (meth)acrylic acid, (meth)acrylic acid $C_1$-$C_{10}$-alkyl esters, vinyl formate, $C_1$-$C_{10}$-alkylcarboxylic acid vinyl esters, ethylenically unsaturated $C_4$-$C_{10}$-dicarboxylic acids and their anhydrides, $C_1$-$C_{20}$-alkyl vinyl ethers, $C_1$-$C_{20}$-alkyl allyl ethers, and a-olefins having 3 to 40 carbon atoms.

5. The copolymer of claim 1, further comprising as a comonomer in in copolymerized form at least one compound of the general formula I(a):

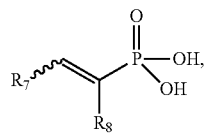

wherein $R^7$ is selected from hydrogen and unbranched and branched $C_1$-$C_{10}$-alkyl, $R^8$ is selected from hydrogen and unbranched and branched $C_1$-$C_{10}$-alkyl; and wherein the alkenylphosphonic diester (c) is a compound of the general formula II:

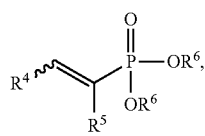

wherein $R^4$ is selected from hydrogen and unbranched and branched $C_1$-$C_{10}$-alkyl, $R^5$ is selected from hydrogen and unbranched and branched $C_1$-$C_{10}$-alkyl, and each $R^6$ is independently selected from phenyl, benzyl, and unbranched and branched $C_1$-$C_{10}$-alkyl, it being possible for the radicals $R^6$ to be joined to one another to form a 5-to 10-membered ring, and wherein $R^1$, $R^4$, and $R^7$ are identical and $R^2$, $R^5$, and $R^8$ are identical.

6. The copolymer according to claim 1, which has an average molecualr weight $M_w$ in the range of from 1,000 to 500,000 g/mol.

7. The copolymer according to claim 6, wherein the alkenylphosphonic diester (c) is a compound of the general formula II:

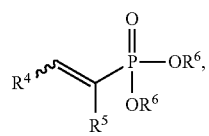

wherein $R^4$ is selected from hydrogen and unbranched and branched $C_1$-$C_{10}$-alkyl, $R^5$ is selected from hydrogen and unbranched and branched $C_1$-$C_{10}$-alkyl, and each $R^6$ is independently selected from phenyl, benzyl, and unbranched and branched $C_1$-$C_{10}$-alkyl, it being possible for the radicals $R^6$ to be joined to one another to form a 5- to 10-membered ring.

8. The copolymer according to claim 7, wherein $R^1$ and $R^4$ are identical and $R^2$ and $R^5$ are identical.

9. A polymer surface or metal surface coated with at least one copolymer according to claim 1.

10. An article having at least one surface according to claim 9.

11. An aqueous formulation comprising 0.01% to 40% by weight of a copolymer according to claim 1.

12. The aqueous formulation according to claim 11, further comprising at least one adjuvant selected from dispersants, surfactants, corrosion inhibitors, antioxidants, biocides, waxes, complexing agents, metal salts, acids, and bases.

13. A process for preparing a copolymer comprising subjecting:

(a) from 86.9 to 96.8 mol % ethylene, (c) one or more alkenylphosphonic diesters of the general formula II:

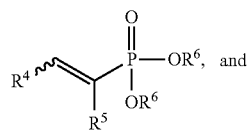

(d) optionally, one or more other free-radically copolymerizable comonomers to copolymerization with one another at 500 to 4,000 bar and reaction temperatures in the range from 150 to 300° C. and subsequently to partial hydrolysis of the copolymerized alkenylphosphonic diester;

wherein $R^4$ is selected from hydrogen and unbranched and branched $C_1$-$C_{10}$-alkyl, $R^5$ is selected from hydrogen and unbranched and branched $C_1$-$C_{10}$-alkyl, and each $R^6$ is independently selected from phenyl, benzyl, and unbranched and branched $C_1$-$C_{10}$-alkyl, it being possible for the radicals $R^6$ to be joined to one another to form a 5- to 10-membered ring;

wherein the copolymer is a free acid or is partially or completely neutralized with alkali metal, alkaline earth metal, ammonia or organic amine.

14. A method comprising providing a layer of a copolymer according to claim 1 on a metal surface or a polymer surface.

15. A method comprising treating surfaces using a copolymer according to claim 1.

16. The method of claim 15, wherein a metal surface or polymer surface, which may be unpretreated or pretreated, is provided with a layer of the copolymer.

17. The method of claim 15, wherein a metal surface or polymer surface is wetted with a solution of the copolymer.

18. The method of claim 15, wherein a metal surface or polymer surface is treated by a continuous coil process.

19. The method of claim 15, wherein a metal surface or polymer surface, which may be unpretreated or pretreated, is provided with a layer of the copolymer and thereafter with a further coating material.

* * * * *